(12) United States Patent
Ishii et al.

(10) Patent No.: US 7,785,411 B2
(45) Date of Patent: Aug. 31, 2010

(54) ANTHRAPYRIDONE COMPOUND OR SALT THEREOF, MAGENTA INK COMPOSITION AND COLORED PRODUCT

(75) Inventors: Yutaka Ishii, Kita-ku (JP); Noriko Kajiura, Kita-ku (JP); Hiroyuki Matsumoto, Kita-ku (JP); Yasuo Murakami, Kita-ku (JP); Tadayuki Kiyoyanagi, Kita-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/312,274

(22) PCT Filed: Nov. 7, 2007

(86) PCT No.: PCT/JP2007/071631

§ 371 (c)(1),
(2), (4) Date: May 1, 2009

(87) PCT Pub. No.: WO2008/056699

PCT Pub. Date: May 15, 2008

(65) Prior Publication Data

US 2010/0075112 A1    Mar. 25, 2010

(30) Foreign Application Priority Data

Nov. 9, 2006  (JP)  ............................. 2006-304023

(51) Int. Cl.
C09D 11/02 (2006.01)
C07D 221/18 (2006.01)
B41J 2/01 (2006.01)
B41M 5/50 (2006.01)

(52) U.S. Cl. ...................... 106/31.47; 546/76; 347/100; 428/195.1

(58) Field of Classification Search .............. 106/31.47, 106/31.77; 546/76; 347/100; 428/195.1
See application file for complete search history.

(56) References Cited

U.S. PATENT DOCUMENTS

| | | | |
|---|---|---|---|
| 4,902,798 A | 2/1990 | Nakamatsu et al. | 546/76 |
| 5,367,075 A | 11/1994 | Nakamatsu et al. | 546/76 |
| 6,152,969 A | 11/2000 | Matsumoto et al. | 8/658 |
| 6,471,760 B1 | 10/2002 | Matsumoto et al. | 106/31.47 |
| 6,843,839 B2 | 1/2005 | Kanke et al. | 106/31.47 |
| 6,852,154 B2 | 2/2005 | Kitamura et al. | 106/31.47 |
| 6,929,361 B2 | 8/2005 | Matsumoto et al. | 106/31.47 |
| 6,949,135 B2 * | 9/2005 | Ishibashi et al. | 106/31.47 |
| 6,984,032 B2 | 1/2006 | Kitamura et al. | 106/31.47 |
| 7,015,327 B2 | 3/2006 | Matsumoto et al. | 546/76 |
| 7,223,301 B2 | 5/2007 | Matsumoto et al. | 106/31.47 |
| 7,416,592 B2 | 8/2008 | Kitamura et al. | 106/31.47 |
| 7,618,484 B2 | 11/2009 | Fujimoto et al. | 106/31.47 |
| 7,678,185 B2 * | 3/2010 | Matsumoto et al. | 106/31.47 |
| 7,691,191 B2 * | 4/2010 | Matsumoto et al. | 106/31.47 |
| 2004/0239739 A1 | 12/2004 | Matsumoto et al. | 347/100 |
| 2005/0171351 A1 | 8/2005 | Matsumoto et al. | 546/76 |
| 2009/0047430 A1 | 2/2009 | Mori et al. | 347/100 |

FOREIGN PATENT DOCUMENTS

| | | |
|---|---|---|
| JP | 63-139170 | 6/1988 |
| JP | 11-29714 | 2/1999 |
| JP | 2000-256587 | 9/2000 |
| JP | 2001-354881 | 12/2001 |
| JP | 2003-335989 | 11/2003 |
| JP | 2005-307067 | 11/2005 |
| JP | 2005-307068 | 11/2005 |
| JP | 2006-083330 | 3/2006 |
| JP | 2007-77256 | 3/2007 |
| WO | 98/11167 | 3/1998 |
| WO | 03/027185 | 4/2003 |

OTHER PUBLICATIONS

The International Search Report dated Jan. 29, 2008.
International Search Report dated Jan. 8, 2008 (PCT/JP2007/072821 in co-pending U.S. Appl. No. 12/312,791).
International Search Report dated Jan. 8, 2008 (PCT/JP2007/072909 in co-pending U.S. Appl. No. 12/312,779).

* cited by examiner

*Primary Examiner*—Helene Klemanski
(74) *Attorney, Agent, or Firm*—Nields, Lemack & Frame, LLC

(57) ABSTRACT

The present invention relates to a novel anthrapyridone compound represented by the following formula (1) or a salt thereof and provides a magenta coloring matter having a very vivid hue suitable for inkjet recording, being strong in fastnesses of recorded matters, and having an excellent storage stability:

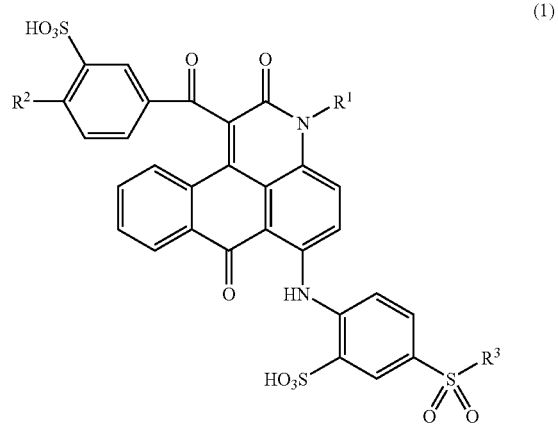

(1)

wherein, $R^1$ represents a hydrogen atom, an alkyl group and the like, $R^2$ represents a hydrogen atom or a methoxy group, and $R^3$ represents an alkyl group which may have an aryl group, a heterocycle group, a sulfonic acid group, a carboxy group, an alkoxycarbonyl group, an acyl group, a carbamoyl group, a cyano group, an alkoxy group, a phenoxy group, a hydroxy group, a nitro group and the like on the alkyl group and further may have a substituent on the aryl group and the heterocycle group respectively.

21 Claims, No Drawings

ANTHRAPYRIDONE COMPOUND OR SALT THEREOF, MAGENTA INK COMPOSITION AND COLORED PRODUCT

TECHNICAL FIELD

The present invention relates to a novel anthrapyridone compound, a magenta ink composition containing the anthrapyridone compound and a colored product obtained using this.

BACKGROUND ART

In the recording method by means of an inkjet printer which is one of the typical methods among various color recording methods, various methods for discharging ink have been developed. In any of the methods, ink droplets are generated and adhered onto various record-receiving materials (such as paper, film and cloth) to perform recording. This has been rapidly prevailing lately and is expected to continue growing remarkably in the future because of features such as quietness without noise generation due to no direct contact of a recording head with a record-receiving material and as easiness in downsizing, speedup and colorization.

Conventionally, as an ink for fountain pens, felt-tip pens or the like and as an ink for inkjet recording, water-based inks where a water-soluble dye is dissolved in an aqueous medium have been used. In these water-based inks, a water-soluble organic solvent is generally added to prevent ink from clogging at a pen tip or an inkjet nozzle. These conventional inks are required to provide recorded images with sufficient density, not to clog at a pen tip or a nozzle, to dry quickly on a record-receiving material, to bleed less, to have an excellent storage stability, and so on. In addition, recorded images formed are required to have fastnesses such as water fastness, light fastness and moisture fastness.

Meanwhile, images or character information on color displays of computers are generally expressed by subtractive color mixing of 4 primary color inks of yellow (Y), magenta (M), cyan (C) and black (K) for color recording by an ink jet printer. In order that the hues of an image expressed by additive color mixing of red (R), green (G) and blue (B) on CRT displays and the like is reproduced, as faithfully as possible, with images expressed by subtractive color mixing, it is desired that each of Y, M and C has a hue as close to each standard as possible and also is vivid. In addition, it is required that ink compositions to be used for them are stable in storage for a long period of time, and that images printed therewith have a high concentration and said images are excellent in fastnesses such as water fastness, light fastness, and gas fastness.

The application of inkjet printers has been widely spread in the fields ranging from small printers for office automation to large printers for industrial use, and therefore fastnesses such as water fastness, moisture fastness, light fastness and gas fastness have been required more than ever. Water fastness has been largely improved by coating organic or inorganic particulates of porous silica, cation polymer, aluminasol, special ceramic and the like together with a PVA resin on a paper surface to provide an image receiving layer on a record-receiving material. "Moisture fastness" means durability against a phenomenon that the dye in a record-receiving material bleeds around the colored image when the colored record-receiving material is stored under an atmosphere of high humidity. Dye bleeding extremely deteriorates image quality in images particularly required to have a high resolution and photo-like image quality, and therefore it is important to reduce such bleeding as far as possible. As for light fastness, technique for large improvement thereof has not established yet. In particular, many of coloring matters for magenta among 4 primary colors of Y, M, C and K originally have low light fastness, and therefore improvement thereof is an important problem. In addition, there are more opportunities to print pictures at home with recent spread of digital cameras, and image discoloration by oxidizing gases such as ozone gas and nitrogen oxides in the air where printed matters obtained are stored is acknowledged as a problem. Oxidizing gas has a nature to react with dyes on or in a recorded paper, causing discoloration or fading of the printed image. Among oxidizing gasses, ozone gas is regarded as a main causative agent accelerating color-fading phenomenon of inkjet-recorded images. This phenomenon of discoloration or fading is characteristic of inkjet images, and therefore improvement of ozone gas fastness is an important problem as well as improvement of light fastness.

As a magenta coloring matter used in water-soluble inks for inkjet recording, typical are xanthene based coloring matters and azo based coloring matters using H acid (1-amino-8-hydroxy-naphthalene-3,6-disulfonic acid). However, the former is very excellent in hue and vividness but very inferior in light fastness. On the other hand, in the latter, some are good in terms of hue and water fastness, but many are inferior in light fastness and vividness. In addition, as for this type, a magenta dye relatively excellent in vividness and light fastness has been developed but it still has a low level in light fastness compared with dyes having a different hue such as a cyan dye represented by a copper phthalocyanine-based coloring matter and a yellow dye.

Examples of a coloring matter for magenta excellent in vividness and light fastness include an anthrapyridone-based coloring matter (see, for example, Patent Literatures 1 to 11), but a coloring matter for magenta satisfying all of hue, vividness, light fastness, moisture fastness, gas fastness and dissolving stability has yet to be obtained.

Patent Literature 1: JP H10-306221 A (pp. 1 to 3 and 7 to 18)
Patent Literature 2: JP 2000-109464 A (pp. 1 to 2 and 8 to 12)
Patent Literature 3: JP 2000-169776 A (pp. 1 to 2 and 6 to 9)
Patent Literature 4: JP 2000-191660 A (pp. 1 to 3 and 11 to 14)
Patent Literature 5: JP 2000-256587 A (pp. 1 to 3 and 7 to 18)
Patent Literature 6: JP 2001-72884 A (pp. 1 to 2 and 8 to 11)
Patent Literature 7: JP 2001-139836 A (pp. 1 to 2 and 7 to 12)
Patent Literature 8: WO 2004/104108 A1 (pp. 20 to 36)
Patent Literature 9: JP 2003-192930 A (pp. 1 to 4 and 15 to 18)
Patent Literature 10: JP 2005-8868 A (pp. 1 to 3 and 15 to 22)
Patent Literature 11: JP 2005-314514 A (pp. 1 to 3 and 15 to 20)

DISCLOSURE OF THE INVENTION

Problems to be Solved by the Invention

It is an object of the present invention to provide a magenta coloring matter (compound) which is high in solubility in water, has a hue and vividness suitable for inkjet recording and enables a recorded matter excellent in light fastness, moisture fastness and gas fastness, and an ink composition containing it.

Means of Solving the Problems

The present inventors have intensively studied to solve the above problems and found that an anthrapyridone compound represented by the formula (1) can solve the above problems, and have now completed the present invention. That is, the present invention relates to:
(1) An anthrapyridone compound represented by the following formula (1) or a salt thereof:

Formula (1)

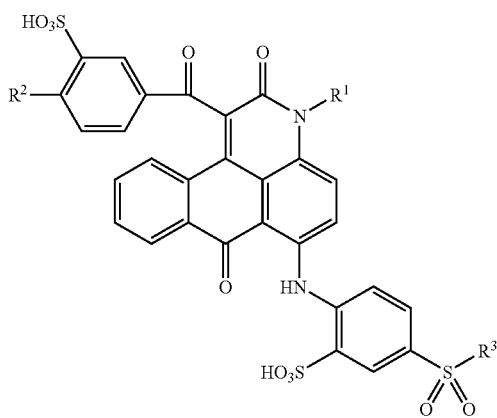

{wherein, $R^1$ represents a hydrogen atom, an alkyl group, a hydroxy lower alkyl group, a cyclohexyl group, a mono- or di-alkyl amino alkyl group or a cyano lower alkyl group, $R^2$ represents a hydrogen atom or a methoxy group, and $R^3$ represents an alkyl group (said alkyl group may have a substituent selected from the group consisting of a sulfonic acid group, a carboxy group, an alkoxycarbonyl group, an acyl group, a carbamoyl group, a cyano group, an alkoxy group, a phenyl alkoxy group, a phenoxy group, a hydroxy group and a nitro group), an aryl alkyl group or a heterocycle-substituted alkyl group (said aryl and said heterocycle may have a substituent selected from the group consisting of a halogen atom, a nitro group, a cyano group, a hydroxy group, a sulfonic acid group, a substituted or unsubstituted alkyl group, a carboxy group, an alkoxycarbonyl group, a carbamoyl group, an alkoxy group and a phenoxy group), respectively}, (2) The anthrapyridone compound or the salt thereof according to the above (1), wherein $R^1$ is a hydrogen atom or a methyl group, (3) The anthrapyridone compound or the salt thereof according to the above (1), wherein $R^1$ is a hydrogen atom or a methyl group, the alkyl group for $R^3$ is a (C1 to C4) alkyl group (said alkyl group may have a substituent selected from the group consisting of a sulfonic acid group, a carboxy group, an alkoxycarbonyl group, an acyl group, a carbamoyl group, a cyano group, an alkoxy group, a phenyl alkoxy group, a phenoxy group, a hydroxy group and a nitro group), and the aryl alkyl group for $R^3$ is a phenyl alkyl group or a naphthyl alkyl group (said phenyl or said naphthyl may have a substituent selected from the group consisting of a halogen atom, a nitro group, a cyano group, a hydroxy group, a sulfonic acid group, a substituted or unsubstituted alkyl group, a carboxy group, an alkoxycarbonyl group, a carbamoyl group, an alkoxy group and a phenoxy group), (4) The anthrapyridone compound or the salt thereof according to the above (1), wherein $R^1$ is a hydrogen atom or a methyl group, the alkyl group for $R^3$ is a (C1 to C4) alkyl group (said alkyl group may have a substituent selected from the group consisting of a sulfonic acid group, a carboxy group, an alkoxycarbonyl group, an acyl group, a carbamoyl group, a cyano group, an alkoxy group, a phenyl alkoxy group, a phenoxy group, a hydroxy group and a nitro group), the aryl alkyl group for $R^3$ is a phenyl (C1 to C2) alkyl group or a naphthyl (C1 to C2) alkyl group (said phenyl or said naphthyl may have a substituent selected from the group consisting of a halogen atom, a nitro group, a cyano group, a hydroxy group, a sulfonic acid group, a substituted or unsubstituted alkyl group, a carboxy group, an alkoxycarbonyl group, a carbamoyl group, an alkoxy group and a phenoxy group), and the heterocycle-substituted alkyl group for $R^3$ is a pyridyl (C1 to C2) alkyl group (said pyridyl may have a substituent selected from the group consisting of a halogen atom, a nitro group, a cyano group, a hydroxy group, a sulfonic acid group, a substituted or unsubstituted alkyl group, a carboxy group, an alkoxycarbonyl group, a carbamoyl group, an alkoxy group and a phenoxy group), (5) The anthrapyridone compound or the salt thereof according to the above (4), wherein the (C1 to C4) alkyl group for $R^3$ is unsubstituted or has a substituent selected from the group consisting of a sulfonic acid group, a carboxy group, a (C1 to C4) alkoxycarbonyl group, an acyl group, a carbamoyl group, a cyano group, a (C1 to C4) alkoxy group, a phenyl (C1 to C4) alkoxy group, a phenoxy group, a hydroxy group and a nitro group, the phenyl (C1 to C2) alkyl group or the naphthyl (C1 to C2) alkyl group or the pyridyl (C1 to C2) alkyl group for $R^3$ is unsubstituted, or each of said phenyl, said naphthyl and said pyridyl has a substituent selected from the group consisting of a halogen atom, a nitro group, a cyano group, a hydroxy group, a sulfonic acid group, an unsubstituted (C1 to C4) alkyl group, a (C1 to C4) alkyl group having a substituent (said substituent is selected from the group consisting of a carboxy group, a (C1 to C4) alkoxycarbonyl group, a (C1 to C4) alkoxy group, a phenoxy group and a sulfonic acid group), a carboxy group, a (C1 to C4) alkoxycarbonyl group, a carbamoyl group, a (C1 to C4) alkoxy group and a phenoxy group, (6) The anthrapyridone compound or the salt thereof according to the above (5), wherein the (C1 to C4) alkyl group for $R^3$ is unsubstituted or has, as a substituent, a group selected from the group consisting of a sulfonic acid group, a carboxy group, a methoxycarbonyl group, a benzoyl group, a carbamoyl group, a cyano group, a methoxy group, a phenyl methoxy group, a phenoxy group, a hydroxy group and a nitro group, and the phenyl (C1 to C2) alkyl group or the naphthyl (C1 to C2) alkyl group or the pyridyl (C1 to C2) alkyl group for $R^3$ is unsubstituted, or each of said phenyl, said naphthyl and said pyridyl has, as a substituent, a group selected from the group consisting of a chlorine atom, a (C1 to C4) alkyl group, a methoxycarbonyl (C1 to C4) alkyl group, a methoxycarbonyl group and a methoxy group, (7) The anthrapyridone compound or the salt thereof according to the above (1), wherein $R^1$ is a methyl group, $R^2$ is a hydrogen atom, and $R^3$ is a phenyl (C1 to C2) alkyl group which may be substituted by an unsubstituted (C1 to C4) alkyl group on the phenyl thereof, (8) The anthrapyridone compound or the salt thereof according to the above (1), wherein $R^1$ is a methyl group, $R^2$ is a hydrogen atom, and $R^3$ is a phenyl (C1 to C2) alkyl group which may be substituted by a methyl group on the phenyl thereof, (9) An ink composition characterized by containing the anthrapyridone compound or the salt thereof according to any one of the above (1) to (8),

(10) The ink composition according to the above (9), which contains water and a water-soluble organic solvent,

(11) The ink composition according to the above (10), which is for inkjet,

(12) The ink composition according to any one of the above (9) to (11), wherein the content of an inorganic salt in the anthrapyridone compound or the salt thereof according to any one of the above (1) to (8) is 1% by weight or less,

(13) The ink composition according to any one of the above (9) to (12), wherein the content of the anthrapyridone compound or the salt thereof according to any one of the above (1) to (8) is 0.1 to 20% by weight,

(14) An inkjet recording method characterized in that droplets of the ink composition according to any one of the above (9) to (13) are discharged responding to a recording signal to carry out recording on a record-receiving material,

(15) The inkjet recording method according to the above (14), wherein the record-receiving material is a communication sheet,

(16) The inkjet recording method according to the above (15), wherein the communication sheet has an ink receiving layer containing a porous white inorganic substance,

(17) A colored product colored with the ink composition according to any one of the above (9) to (13),

(18) The colored product according to the above (17), which is colored by an inkjet printer,

(19) An inkjet printer where a container containing the ink composition according to any one of the above (9) to (13) is installed,

(20) The anthrapyridone compound or the salt thereof according to the above (1), wherein $R^1$ is a methyl group, $R^2$ is a hydrogen atom, and $R^3$ is a benzyl group or a tolylmethyl group,

(21) An ink composition containing the anthrapyridone compound or the salt thereof according to the above (20).

Effect of the Invention

The anthrapyridone compound of the above formula (1) of the present invention has characteristics to exhibit a very vivid hue on inkjet recording paper and have an excellent water-solubility and good filtration properties to a membrane filter in the production process of an ink composition. In addition, the ink composition of the present invention using this compound is free from crystal precipitation, changes in physical properties and color, and the like after storage for a long period of time, and thus it has a good storage stability. Further, a printed matter using the anthrapyridone compound of the present invention as a magenta ink for inkjet recording has an ideal magenta hue without selecting a particular record-receiving material (paper, film and the like). Furthermore, the magenta ink composition of the present invention also enables faithful reproduction of the hue of a photo-like color image on paper. Moreover, even when recording is carried out on a record-receiving material coated with inorganic particles on the surface thereof, such as inkjet special paper or film for photo image quality, the recorded image has good fastnesses, i.e. light fastness, ozone gas fastness, moisture fastness and the like, and a long-term storage stability in a photo-like recorded image is excellent. Therefore, the anthrapyridone compound of the above formula (1) is extremely useful as a coloring matter for an ink for inkjet recording.

BEST MODE FOR CARRYING OUT THE INVENTION

The present invention will be more specifically explained. The anthrapyridone compound of the present invention or a salt thereof is represented by the above formula (1) in free acid form.

The term "alkyl" used in the present description typically means alkyl having about 1 to 15 carbon atoms and is preferably alkyl having 1 to 8 carbon atoms, and examples thereof include, for example, methyl, ethyl, n-propyl, iso-propyl, n-butyl, sec-butyl, t-butyl, iso-butyl, n-pentyl, n-hexyl, n-heptyl, n-octyl and the like. In addition, in the terms "alkoxy" and "acyl", it means that the alkyl group portion of groups thereof has the same number of carbon atoms as the above alkyl has.

In addition, when describing "lower alkyl group", examples of said lower alkyl group can typically include alkyl groups having 1 to 8 carbon atoms, preferably 1 to 6 carbon atoms and more preferably 1 to 4 carbon atoms, among the above alkyl groups. Preferable specific examples thereof can include methyl, ethyl, n-propyl, isopropyl, isobutyl and the like.

For convenience, in the present description, when describing "lower" in a group such as lower alcohols except for lower alkyl groups, it means to have the same range of carbon atoms as above, unless otherwise specified.

With regard to description of substituent and the like in the present description, the substituents or the like is typically meant to be unsubstituted unless specified that it may have a substituent.

In addition, the superscript "RTM" in the present description denotes a registered trademark.

In the formula (1), $R^1$ represents a hydrogen atom, an alkyl group, a hydroxy lower alkyl group, a cyclohexyl, a mono- or di-alkyl aminoalkyl group, or a cyano lower alkyl group.

Hereinafter, each group for $R^1$ will be specifically explained.

Examples of the alkyl group include the groups as described above, a lower alkyl group is preferable, and more preferable is a methyl group.

Examples of the hydroxy lower alkyl group can typically include a hydroxy (C1 to C8) alkyl group, preferably a hydroxy (C1 to C6) alkyl group and more preferably a hydroxy (C1 to C4) alkyl group, for example, hydroxyethyl, hydroxypropyl, hydroxybutyl and the like.

Examples of the mono or di-alkyl amino alkyl group can typically include a mono- or di-(C1 to C8) alkyl amino (C1 to C8) alkyl group, preferably a mono- or di-(C1 to C6) alkyl amino (C1 to C6) alkyl group and more preferably a mono- or di-(C1 to C4) alkyl amino (C1 to C4) alkyl group. Specific examples thereof include, for example, methylaminopropyl, ethylaminopropyl, dimethylaminopropyl or diethylaminoethyl.

Examples of the cyano lower alkyl group can typically include a cyano (C1 to C8) alkyl group, preferably a cyano (C1 to C6) alkyl group and more preferably a cyano (C1 to C4) alkyl group. Specific examples thereof include, for example, cyanoethyl, cyanopropyl, cyanobutyl and the like.

Preferable examples of $R^1$ include a hydrogen atom or a lower alkyl group, a hydrogen atom and methyl are more preferable, and methyl is particularly preferable.

In the above formula (1), $R^2$ represents a hydrogen atom or a methoxy group, and a hydrogen atom is preferable.

Next, each group for $R^3$ in the above formula (1) will be specifically explained.

When $R^3$ is an alkyl group, it may be substituted or unsubstituted. In any case, it is preferably a lower alkyl group and more preferably methyl or ethyl. Examples of the substituent in a substituted alkyl group except for the aryl alkyl group and the heterocycle-substituted alkyl group which will be separately explained below can include a group selected from the group consisting of a sulfonic acid group, a carboxy group, an alkoxycarbonyl group, an acyl group, a carbamoyl group, a cyano group, an alkoxy group, a phenylalkoxy group, a phenoxy group, a hydroxy group and a nitro group.

The aryl alkyl group is preferably an aryl (C1 to C4) alkyl group. Examples of said aryl group include an aryl group where the aryl ring is composed of C6 to C14, such as phenyl, naphthyl, anthracenyl and the like, and preferable are phenyl or naphthyl. More preferable is a phenyl or naphthyl (C1 to C2) alkyl group. These aryl groups, preferably phenyl or naphthyl, may be substituted by a substituent which will be described later. Specific examples of the aryl alkyl group where the aryl group is unsubstituted include benzyl, phenylethyl, phenylpropyl, phenylbutyl, naphthylmethyl, naphthylethyl, naphthylpropyl or naphthylbutyl. Examples of the phenyl or naphthyl (C1 to C2) alkyl group substituted by a substituent can include a group substituted by a substituent described later on the phenyl or naphthyl of the aryl alkyl group where the aryl group is unsubstituted as listed above.

The aryl alkyl group which may be substituted is more preferably a phenyl or naphthyl (C1 to C2) alkyl group which may be substituted by a lower alkyl group, and further preferably benzyl which may be substituted by a lower alkyl group. Most preferable is benzyl or tolylmethyl (preferably p-tolylmethyl).

As the heterocycle-substituted alkyl group, a heterocycle-substituted (C1 to C4) alkyl group is preferable and a heterocycle-substituted (C1 to C2) alkyl group is more preferable. Examples of said hetero ring can preferably include a pyridine ring, for example, 2-, 3- and 4-pyridine rings. Specific examples thereof include pyridylmethyl, pyridylethyl, pyridylpropyl or pyridylbutyl. Among them, a pyridyl (C1 to C2) alkyl group is more preferable. The hetero ring, preferably the pyridine ring, herein may be substituted by a substituent described later, and preferably is unsubstituted or substituted by lower alkyl, and more preferably unsubstituted.

Preferable as the sulfo alkyl group is a sulfo (C1 to C4) alkyl group. Specific examples thereof include sulfomethyl, 2-sulfoethyl, 3-sulfopropyl or 4-sulfobutyl.

Preferable as the carboxy alkyl group is a carboxy (C1 to C4) alkyl group. Specific examples thereof include carboxymethyl, 2-carboxyethyl, 3-carboxypropyl or 4-carboxybutyl.

Preferable as the alkoxycarbonyl alkyl group is a (C1 to C4) alkoxycarbonyl (C1 to C4) alkyl group. Specific examples thereof include methoxycarbonylmethyl, 2-methoxycarbonylethyl, 3-methoxycarbonylpropyl or 4-methoxycarbonylbutyl.

Preferable as the acyl alkyl group is a (C1 to C4) alkylcarbonyl (C1 to C4) alkyl group or a phenyl carbonyl (C1 to C4) alkyl group. Specific examples thereof include methylcarbonylmethyl, 2-methylcarbonylethyl, 3-methylcarbonylpropyl, 4-methylcarbonylbutyl and phenacyl.

Preferable as the carbamoyl alkyl group is a carbamoyl (C1 to C4) alkyl group. Specific examples thereof include carbamoylmethyl, 2-carbamoylethyl, 3-carbamoylpropyl or 4-carbamoylbutyl.

Preferable as the cyano alkyl group is preferably a cyano (C1 to C4) alkyl group. Specific examples thereof include cyanomethyl, 2-cyanoethyl, 3-cyanopropyl or 4-cyanobutyl.

Preferable as the alkoxy alkyl group is a (C1 to C4) alkoxy (C1 to C4) alkyl group. Specific examples thereof include methoxymethyl, 2-methoxyethyl, 3-methoxypropyl or 4-methoxybutyl.

Preferable as the phenyl alkoxy alkyl group is a phenyl (C1 to C4) alkoxy (C1 to C4) alkyl group, and specific examples thereof include benzyloxymethyl, 2-benzyloxyethyl, 3-benzyloxypropyl or 4-benzyloxybutyl.

Preferable as the phenoxy alkyl group is a phenoxy (C1 to C4) alkyl group, and specific examples thereof include phenoxymethyl, 2-phenoxyethyl, 3-phenoxypropyl or 4-phenoxybutyl.

Preferable as the hydroxy alkyl group is a hydroxy (C1 to C4) alkyl group. Specific examples thereof include hydroxymethyl, 2-hydroxyethyl, 3-hydroxypropyl or 4-hydroxybutyl.

Preferable as the nitro alkyl group is a nitro (C1 to C4) alkyl group. Specific examples thereof include nitromethyl, 2-nitroethyl, 3-nitropropyl or 4-nitrobutyl.

In the case of the above aryl alkyl or heterocycle-substituted alkyl group, said aryl and said heterocycle may have a substituent selected from the group consisting of a halogen atom, nitro, cyano, hydroxy, sulfonic acid, a substituted or unsubstituted alkyl group, carboxy, an alkoxycarbonyl group, carbamoyl, an alkoxy group and phenoxy.

Examples of the halogen atom on the above aryl group or heterocycle include a fluorine atom, a chlorine atom, a bromine atom or an iodine atom, and a chlorine atom is preferable.

The "substituted or unsubstituted alkyl group" on the above aryl group or heterocycle is preferably an unsubstituted (C1 to C4) alkyl group and a (C1 to C4) alkyl group substituted by a group selected from the group consisting of carboxy, an alkoxycarbonyl group, an alkoxy group, phenoxy and sulfonic acid as a substituent. More preferably is an unsubstituted (C1 to C4) alkyl group or a (C1 to C4) alkoxycarbonyl (C1 to C4) alkyl group. The (C1 to C4) alkyl group in these groups is preferably methyl, ethyl, n-propyl, isopropyl, n-butyl, sec-butyl, isobutyl or t-butyl and more preferably methyl. The alkoxycarbonyl group herein is preferably a (C1 to C4) alkoxycarbonyl group and more preferably methoxycarbonyl. The alkoxy group is preferably a (C1 to C4) alkoxy group or phenoxy, and examples of the (C1 to C4) alkoxy group include methoxy, ethoxy, n-propoxy, isopropoxy, n-butoxy, sec-butoxy, isobutoxy or t-butoxy.

One preferable example of $R^3$ includes a substituted or unsubstituted (C6 to C10) aryl (C1 to C4) alkyl group, and more preferably a substituted or unsubstituted phenyl or naphthyl (C1 to C4, preferably C1 to C2) alkyl group. The substituent of the substituted aryl, more preferably substituted phenyl or substituted naphthyl, among these groups is one of the above substituents. More preferable is a phenyl or naphthyl (C1 to C4, preferably C1 to C2) alkyl group substituted by a substituent among the preferable substituents listed above. For example, examples of the preferable substituted aryl alkyl include a (C1 to C4) alkylphenyl (C1 to C4, preferably C1 to C2) alkyl group. Said substituted or unsubstituted (C6 to C10) aryl (C1 to C4) alkyl group is more preferably a (C1 to C4) alkyl-substituted or unsubstituted phenyl (C1 to C4, preferably C1 to C2) alkyl group, and most preferably tolylmethyl or benzyl.

Preferable examples of $R^3$ specifically include an unsubstituted (C1 to C4) alkyl group, or a substituted alkyl group having a group selected from the group consisting of a sulfonic acid group, a carboxy group, a (C1 to C4) alkoxycarbonyl group, an acyl group, a carbamoyl group, a cyano group, a (C1 to C4) alkoxy group, a phenyl (C1 to C4) alkoxy group, a phenoxy group, a hydroxy group and a nitro group as substituent; an unsubstituted phenyl (C1 to C2) alkyl group or an unsubstituted naphthyl (C1 to C2) alkyl group, or a substituted phenyl or naphthyl (C1 to C2) alkyl group having a group selected from the group consisting of a halogen atom, a nitro group, a cyano group, a hydroxy group, a sulfonic acid group, an unsubstituted (C1 to C4) alkyl group, a substituted (C1 to C4) alkyl group (the substituent on said alkyl group is a group selected from the group consisting of a carboxy group, a (C1 to C4) alkoxycarbonyl group, a (C1 to C4) alkoxy group, a phenoxy group and a sulfonic acid group), a carboxy group, a (C1 to C4) alkoxycarbonyl group, a carbamoyl group, a (C1 to C4) alkoxy group and a phenoxy group as a substituent on the phenyl or naphthyl group thereof; or an unsubstituted pyridyl (C1 to C2) alkyl group or a substituted pyridyl (C1 to C2) alkyl group having a group listed as the substituents for the above substituted phenyl group, as a substituent on said pyridyl group.

More preferable examples of $R^3$ can include an unsubstituted (C1 to C4) alkyl group or a substituted alkyl group having a group selected from the group consisting of a sulfonic acid group, a carboxy group, a methoxycarbonyl group, a benzoyl group, a carbamoyl group, a cyano group, a methoxy group, a phenyl methoxy group, a phenoxy group, a hydroxy group and a nitro group as substituent; an unsubstituted phenyl (C1 to C2) alkyl group or an unsubstituted naphthyl (C1 to C2) alkyl group, or a substituted phenyl or naphthyl (C1 to C2) alkyl group having a group selected from the group consisting of a chlorine atom, a (C1 to C4) alkyl group, a methoxycarbonyl (C1 to C4) alkyl group, a methoxycarbonyl group and a methoxy group on said phenyl group or said naphthyl group; or an unsubstituted pyridyl (C1 to C2) alkyl group or a substituted pyridyl (C1 to C2) alkyl group having a group selected from the group consisting of a chlorine atom, an unsubstituted (C1 to C4) alkyl group, a methoxycarbonyl (C1 to C4) alkyl group, a methoxycarbonyl group and a methoxy group on said pyridyl group.

$R^3$ is further preferably the above (C1 to C4) alkyl substituted or unsubstituted phenyl (C1 to C4, preferably C1 to C2) alkyl group and most preferably tolylmethyl or benzyl.

The salt of the compound of the above formula (1) is a salt with an inorganic or organic base. Said salt is preferably, for example, an alkali metal salt (for example, a lithium salt, a sodium salt or a potassium salt) or a salt (ammonium salt) with an ammonium ion represented by the following formula (2).

Formula (2)

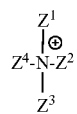

(2)

(wherein, each of $Z^1$ to $Z^4$ independently represents a hydrogen atom, an alkyl group, a hydroxy alkyl group or a hydroxyalkoxyalkyl group.)

Examples of the alkyl group for $Z^1$ to $Z^4$ in the formula (2) include methyl or ethyl, examples of the hydroxy alkyl group therefor include hydroxymethyl, 2-hydroxyethyl, 3-hydroxypropyl, 2-hydroxypropyl, 4-hydroxybutyl, 3-hydroxybutyl or 2-hydroxybutyl, and in addition, examples of the hydroxyalkoxyalkyl group therefor include hydroxyethoxymethyl, 2-hydroxyethoxyethyl, 3-hydroxyethoxypropyl, 3-hydroxyethoxybutyl or 2-hydroxyethoxybutyl.

Preferable examples of the base used to form the above salt can include, for example, sodium, potassium, lithium, monoethanolamine, diethanolamine, triethanolamine, monoisopropanolamine, diisopropanolamine, triisopropanolamine or ammonium. The salt of the compound of formula (1) with one of these bases is more preferable. Further preferable salt is a lithium salt, an ammonium salt or a sodium salt.

As a production method of the above salt, for example, it is possible to obtain a sodium salt of the compound of the formula (1) as a wet cake by adding a sodium chloride to a reaction liquid containing the compound of the formula (1) or an aqueous solution dissolving a cake containing the compound of the formula (1) or a dried form thereof, by salting out and filtering. In addition, it is possible to obtain a compound represented by the formula (1) in free acid form by dissolving the obtained wet cake in water again, then adding hydrochloric acid thereto for adjusting the pH to 1 to 2, and separating obtained crystals by filtration. Further, it is also possible to obtain a mixture of the sodium salt and the free acid by controlling the addition amount of hydrochloric acid to adjust pH to a more neutral value, and separating obtained crystals by filtration. The mixture ratio of the both can be appropriately controlled by adjusting the pH. Furthermore, while stirring the wet cake of free acid together with water, for example, a potassium hydroxide, a lithium hydroxide or ammonia water is added thereto for adjusting to alkaline, thereby, it is possible to obtain a corresponding potassium, lithium or ammonium salt, respectively; or, a compound which becomes an organic cation represented by the above formula (2) in water is added thereto for adjusting to alkaline, and, thereby, it is possible to obtain an organic ammonium salt corresponding said organic cation. Moreover, it is also possible to obtain a mixed salt of sodium and potassium or a mixture of sodium, potassium and free acid by dissolving, for example, a mixture of free acid and sodium salt as a wet cake in water and then adding a potassium hydroxide thereto. Among these salts, particularly preferable are a lithium salt, an ammonium salt and a sodium salt as described above.

The anthrapyridone compound of the present invention is preferably a compound of the formula (1) wherein $R^1$ is a hydrogen atom or a methyl group and more preferably a methyl group, $R^2$ is a hydrogen atom or a methoxy group and more preferably a hydrogen atom, and $R^3$ is a group listed specifically in the above preferable examples of $R^3$ and more preferably a group listed in the above more preferable examples of $R^3$. The compound where $R^1$ is a hydrogen atom or a methyl group and more preferably a methyl group, $R^2$ is a hydrogen atom or a methoxy group and more preferably a hydrogen atom, and $R^3$ is a (C1 to C4) alkylphenyl (C1 to C4, preferably C1 to C2) alkyl group or a phenyl (C1 to C4, preferably C1 to C2) alkyl group is one of the above more preferable compounds, and it is the most preferable compound when $R^3$ is tolylmethyl or benzyl. In addition, with respect to the foregoing, the compound where $R^1$ is a methyl group, $R^2$ is a hydrogen atom, and $R^3$ is a (C1 to C4) alkyl substituted or unsubstituted phenyl (C1 to C4, preferably C1 to C2) alkyl group is one of the above more preferable compounds, and it is one of the above most preferable compounds when $R^3$ is tolylmethyl or benzyl.

Specific examples of the anthrapyridone compound represented by the above formula (1) of the present invention are shown in the following table 1.

TABLE 1

| No. | R1 | R2 | R3 |
|---|---|---|---|
| 1 | $CH_3$ | H | Benzyl |
| 2 | $CH_3$ | H | p-Tolylmethyl |
| 3 | $CH_3$ | H | o-Tolylmethyl |
| 4 | $CH_3$ | H | m-Tolylmethyl |
| 5 | $CH_3$ | H | Phenylethyl |
| 6 | $CH_3$ | H | 1-Naphthylmethyl |
| 7 | $CH_3$ | H | p-Methoxybenzyl |
| 8 | $CH_3$ | H | 2-Sulfoethyl |
| 9 | $CH_3$ | H | Carboxymethyl |
| 10 | $CH_3$ | H | Methoxycarbonylmethyl |
| 11 | $CH_3$ | H | 2-(Methoxycarbonyl)phenylmethyl |
| 12 | $CH_3$ | H | Phenacyl |
| 13 | $CH_3$ | H | 2-Carbamoylethyl |
| 14 | $CH_3$ | H | 2-Cyanoethyl |
| 15 | $CH_3$ | H | 2-Benzyloxyethyl |
| 16 | $CH_3$ | H | 2-Hydroxyethyl |
| 17 | $CH_3$ | H | 2-Nitroethyl |
| 18 | $CH_3$ | H | p-Chlorobenzyl |
| 19 | $CH_3$ | H | 2-(Methoxycarbonylmethyl)phenylmethyl |
| 20 | $CH_3$ | H | Ethyl |
| 21 | $CH_3$ | H | Butyl |
| 22 | $CH_3$ | H | 2-Pyridylmethyl |
| 23 | $CH_3$ | H | 3-Methylbutyl |
| 24 | $CH_3$ | OMe | Benzyl |
| 25 | $CH_3$ | OMe | p-Tolylmethyl |
| 26 | H | H | Benzyl |
| 27 | H | H | p-Tolylmethyl |

Hereinafter, the production method of the compound of the present invention will be described. In this connection, $R^1$ to $R^3$ described in the following formulas (3) to (8) have the same meanings as in the above formula (1).

The anthrapyridone compound of the present invention is produced, for example, in the following method. That is, 1 mol of an anthraquinone compound represented by the following formula (3) is reacted with 1.1 to 3 mol of ethyl benzoylacetate which may have a methoxy substituent, in a polar solvent such as xylene in the presence of a basic compound such as sodium carbonate at 130 to 180° C. for 5 to 15 hours to obtain a compound of the following formula (4).

Formula (3)

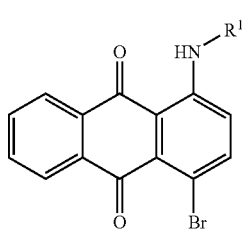

(3)

Formula (4)

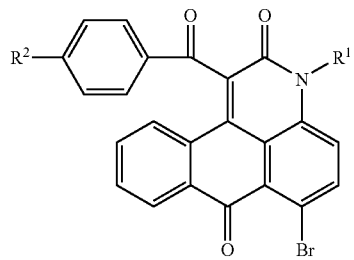

(4)

Then, 1 mol of the obtained compound of the above formula (4) is condensed with 1 to 5 mol of para-aminoacetoanilide by Ullmann reaction in an aprotic polar organic solvent such as N,N-dimethylformamide in the presence of a base such as sodium carbonate and a copper catalyst such as copper acetate at 110 to 150° C. for 2 to 6 hours to obtain a compound of the following formula (5).

Formula (5)

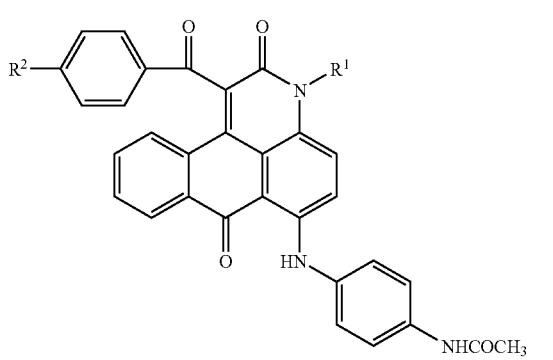

(5)

Then, the obtained compound of the above formula (5) is sulfonated in 8 to 15% fuming sulfuric acid at 50 to 120° C., and at the same time, an N-acetyl group existing in the molecule is hydrolyzed to obtain an anthrapyridone compound of the following formula (6).

Formula (6)

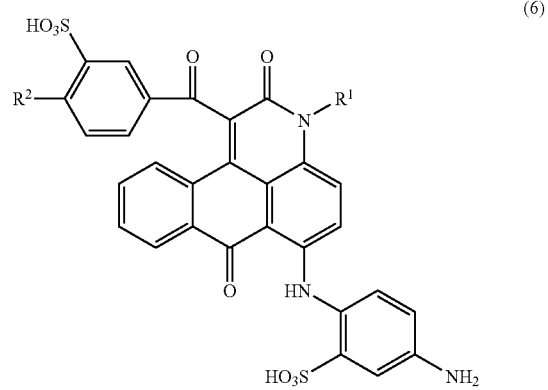

(6)

Then, 1 mol of the obtained compound of the above formula (6) is diazotized in water in the conventional manner, and then added dropwise to an aqueous solution heated to room temperature or at 50 to 80° C. of 1 to 4 mol of potassium xanthogenate subsequently followed by heating to 50 to 80° C. at pH=7 to 10 to obtain an anthrapyridone compound of the following formula (7).

Formula (7)

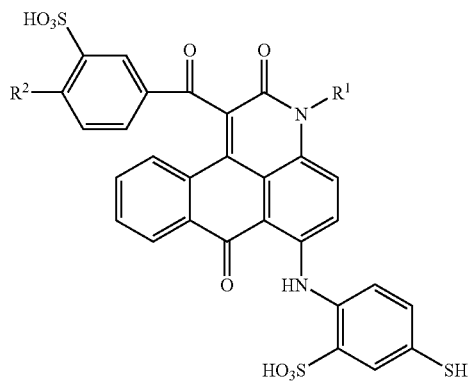

(7)

Then, 1 mol of the obtained compound of the above formula (7) is reacted with 1 to 5 mol of an alkyl halide or p-toluene sulfonate corresponding to $R^3$ of the formula (1) in water or an organic solvent at pH 8 to 12 and 30 to 100° C. for 10 minutes to 5 hours to obtain an anthrapyridone compound of the formula (8).

Formula (8)

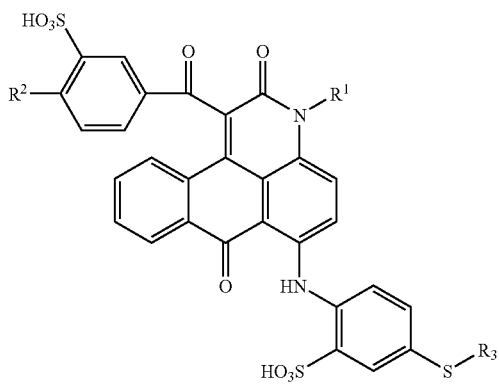

(8)

Then, 1 mol of the obtained compound of the above formula (8) is dissolved in water or an organic solvent, and acetic acid, 0.1 to 1 mol of sodium tungstate and hydrogen peroxide solution or m-chloroperbenzoic acid are added thereto and reacted at 20 to 80° C. to obtain an anthrapyridone compound represented by the above formula (1) of the present invention.

The compound of the above formula (1) can be obtained in free acid from or in its salt form. These compounds of the present invention are used as a free acid or as a salt thereof, for example, an alkali metal salt, an alkali earth metal salt, an alkyl amine salt, an alkanolamines salt, an ammonium salt or the like. The production method of converting the various salts to the free acid and the production method of converting the free acid to the various salts, the various mixed salts or the mixture of the free acid and the various salts are as described above.

When the compound represented by the above formula (1) is used, a less content of inorganic impurities such as metal cation chloride and sulfate contained together with said compound is preferable for use. The content is about, for example, 1% by weight or less only as a guide. In order to produce a compound of the present invention having less inorganic impurities, desalting treatment of the above obtained compound of the present invention may be carried out by, for example, a ordinary method using a reverse osmosis membrane.

The ink composition of the present invention is a composition obtained by dissolving the compound represented by the above formula (1) of the present invention or a salt thereof in water or an aqueous solvent (water containing a water-soluble organic solvent which will be described later), according to necessity, together with an ink preparation agent and the like. For example, a reaction liquid containing the compound represented by the above formula (1) can also be directly used for production of the ink composition of the present invention. Alternatively, an intended product is separated from the above reaction liquid and dried by, for example, spray-drying to obtain a dried form, which can be then used for production of said ink composition. The ink composition of the present invention contains the compound of the present invention in an amount of typically 0.1 to 20% by weight, more preferably 1 to 15% by weight and further preferably 2 to 10% by weight. The ink composition of the present invention may contain 0 to 30% by weight of a water-soluble organic solvent and 0 to 10%, preferably 0 to 5% by weight, of an ink preparation agent, respectively. The rest is water.

Examples of the above water-soluble organic solvent include, for example, C1 to C4 alkanols such as methanol, ethanol, n-propanol, isopropanol, n-butanol, isobutanol, secondary butanol and tertiary butanol; carboxylic acid amides such as N,N-dimethylformamide or N,N-dimethylacetoamide; heterocyclic ureas such as 2-pyrrolidone, N-methyl-2-pyrrolidone, 1,3-dimethylimidazolidin-2-one and 1,3-dimethylhexahydropyrimid-2-one; ketones or keto alcohols such as acetone, methyl ethyl ketone or 2-methyl-2-hydroxypentan-4-one; cyclic ethers such as tetrahydrofuran and dioxane; mono-, oligo- or poly-alkylene glycols having a (C2 to C6) alkylene unite or thioglycols such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol and polypropylene glycol; polyols (preferably triol) such as glycerine and hexane-1,2,6-triol; polyhydric alcohol (C1 to C4) alkyl ethers such as ethylene glycol monomethyl ether or ethylene glycol monoethyl ether, diethylene glycol mono methyl ether, diethylene glycol monoethyl ether, diethylene glycol mono butyl ether, triethylene glycol monomethyl ether or triethylene glycol monoethyl ether; γ-butyrolactone or dimethylsulfoxide.

Preferable among the above are isopropanol, glycerine, mono-, di- or tri-ethylene glycol, dipropylene glycol, 2-pyrrolidone, N-methyl-2-pyrrolidone and/or diethylene glycol mono butyl ether, and more preferable are isopropanol, glycerine, diethylene glycol monobutyl ether (butyl carbitol), 2-pyrrolidone and/or N-methyl-2-pyrrolidone. These water-soluble organic solvents are used alone or as a mixture thereof. Typically, about 2 to 5 kinds thereof are preferably used appropriately in combination.

Hereinafter, the ink preparation agents which can be used in preparation of the ink composition of the present invention will be explained. Specific examples of the ink preparation agents include, for example, an antiseptic and fungicide, a pH adjuster, a chelating agent, a rust preventive agent, a water-soluble UV absorbing agent, a water-soluble polymer compound, a dye dissolving agent, a surfactant and the like.

Examples of the antiseptic and fungicide include, for example, organic sulfur based, organic nitrogen sulfur based, organic halogen based, haloallylsulfone based, iodopropargyl based, N-haloalkylthio based, nitrile based, pyridine based, 8-oxyquinoline based, benzothiazole based, isothiazoline based, dithiol based, pyridineoxide based, nitropropane based, organic tin based, phenol based, quaternary ammonium salt based, triazine based, thiadiazine based, anilide based, adamantane based, dithiocarbamate based, brominated indanone based, benzyl bromoacetate based and inorganic salt based compounds, and the like.

Examples of the organic halogen based compound include, for example, sodium pentachlorophenol.

Examples of the pyridineoxide based compound include, for example, sodium 2-pyridinethiol-1-oxide.

Examples of the isothiazoline based compound include, for example, 1,2-benzoisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride and the like.

In addition, examples of the antiseptic and fungicide include sodium sorbate, sodium benzoate and the like (for example, trade name: Proxel® GXL(S), Proxel® XL-2(S) which are all manufactured by Avecia Corp., and the like), and further anhydrous sodium acetate and the like.

As the pH adjuster, any substance can be used as long as it can adjust the pH of the ink in the range of 7.5 to 11.0 without any adverse effect on the ink to be mixed. For example, examples thereof include alkanolamines such as diethanolamine and triethanolamine, alkali metal hydroxides such as lithium hydroxide, sodium hydroxide and potassium hydroxide, ammonium hydroxides, alkali metal carbonates such as lithium carbonate, sodium carbonate and potassium carbonate, or the like.

Examples of the chelating agent include, for example, sodium ethylenediaminetetraacetate, sodium nitrilotriacetate, sodium hydroxyethylethylenediaminetriacetate, sodium diethylenetriamine pentaacetate, sodium uracil diacetate and the like.

Examples of the rust preventive agent include, for example, hydrogen sulfite salt, sodium thiosulfate, ammonium thioglycolate, diisopropylammonium nitrite, pentaerythritol tetranitrate, dicyclohexylammonium nitrite and the like.

Examples of the water-soluble UV absorbing agent include, for example, sulfonated benzophenon, sulfonated benzotriazole and the like.

Examples of the water-soluble polymer compound include, for example, polyvinyl alcohol, cellulose derivatives, polyamines, polyimines and the like.

Examples of the dye dissolving agent include, for example, urea, ε-caprolactam, ethylene carbonate and the like.

Examples of the surfactant include, for example, an anionic surfactant, an amphoteric surfactant, a cationic surfactant, a nonionic surfactant and the like.

Examples of the anionic surfactant include alkylsulfocarboxylate, α-olefin sulfonate, polyoxyethylene alkyl ether acetate, N-acyl amino acid and a salt thereof, N-acylmethyltaurine salt, alkylsulfate polyoxyalkyl ether sulfate, alkylsulfate polyoxyethylene alkyl ether phosphate, rosin acid soap, castor oil sulfate, lauryl alcohol sulfate, alkylphenol type phosphate, alkyl type phosphate, alkyl allylsulfonate, diethyl sulfosuccinate, diethylhexyl sulfosuccinate, dioctyl sulfosuccinate and the like.

Examples of the cationic surfactant include 2-vinylpyridine derivatives, poly(4-vinylpyridine) derivatives and the like.

Examples of the amphoteric surfactant include lauryldimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine, and in addition, imidazoline derivatives and the like.

Examples of the nonionic surfactant include ether based surfactants such as polyoxyethylene nonylphenyl ether, polyoxyethylene octylphenyl ether, polyoxyethylene dodecylphenyl ether, polyoxyethylene octylphenyl ether, polyoxyethylene oleyl ether, polyoxyethylene lauryl ether and polyoxyethylene alkyl ether; ester based surfactants such as polyoxyethylene oleic acid, polyoxyethylene oleate ester, polyoxy ethylene distearic acid ester, sorbitan laurate, sorbitan monostearate, sorbitan monooleate, sorbitan sesquioleate, polyoxyethylene monooleate and polyoxyethylene stearate; and acetylene alcohol based surfactants such as 2,4,7,9-tetramethyl-5-decyne-4,7-diol, 3,6-dimethyl-4-octyne-3,6-diol and 3,5-dimethyl-1-hexyn-3-ol (for example, trade name: Surfynol® 104E, 104PG 50, 82 and 465, and Olfine® STG which are all manufactured by Nissin Chemical Industry Co., Ltd, and the like). These ink preparation agents may be used alone or as a mixture thereof.

The ink composition of the present invention can be produced by dissolving the compound of the present invention (the compound of the formula (1) and/or a salt thereof; hereinafter also referred to as the present compound) in water or the above aqueous solvent (water containing a water-soluble organic solvent) and according to necessity, together with the above ink preparation agents.

In the above production method, the order of dissolving the components is not particularly limited. The present compound may be dissolved in water or the above aqueous solvent in advance and then ink preparation agents may be added thereto; or the present compound may be dissolved in water and then the aqueous solvent and ink preparation agents may be added thereto. In addition, the order may be different from this; otherwise the aqueous solvent and ink preparation agents may be added to a reaction liquid of the present compound or a solution of the present compound after desalting treatment is carried out using a reverse osmosis membrane to produce an ink composition. In preparation of said ink composition, water to be used is preferably less in amount of impurities, such as ion-exchanged water or distilled water. In addition, according to necessity, microfiltration may be carried out using a membrane filter or the like to remove off foreign substances. Further, when said ink composition is used as an ink for inkjet printers, it is preferred that microfiltration is carried out. The pore size of a filter for microfiltration is typically 1 to 0.1 micrometer and preferably 0.8 to 0.2 micrometers.

The colored product of the present invention is a product colored with the above compound of the present invention. The material to be colored therewith is not limited, and examples thereof include, for example, paper, fiber and cloth (cellulose, nylon, wool and the like), leather, substrates for color filters and the like, but the material is not limited thereto. Examples of the coloring method include, for example, printing methods such as dip dyeing, textile printing and screen printing, a method by inkjet recording and the like. In the present invention, a method by inkjet recording is preferred.

Examples of the record-receiving material (medium) which can be applied to the inkjet recording method of the present invention include, for example, communication sheets such as paper and film, fiber, leather and the like. The communication sheet is preferably provided with surface treatment, specifically with an ink receiving layer on the substrate thereof. The ink receiving layer is provided by, for example, impregnation or coating of a cation polymer on the above substrate, or by coating a porous white inorganic substance which can absorb the coloring matter in the ink, such as porous silica, aluminasol and special ceramics, together with a hydrophilic polymer such as polyvinyl alcohol or polyvinyl pyrrolidone on the above substrate surface. Such record-receiving material provided with an ink receiving layer is called typically inkjet special paper (film) or glossy paper (film) and the like, and examples thereof include, for example, Pictorico® (manufactured by Asahi Glass Co., Ltd.), Professional Photopaper, Super Photopaper and Matte Photopaper (which are all manufactured by Canon Inc.), CRISPIA®, Photo Paper (glossy), Photo Matte Paper and Super Fine Glossy Film (which are all manufactured by Seiko Epson Corporation), Advanced Photo Paper, Premium Plus Photo Paper, Premium Glossy Film and Photo Paper (which are all manufactured by Hewlett Packard Japan, Ltd.), PhotoLikeQP (manufactured by KONICA Corporation) and the like. In addition, it is naturally possible to employ plain paper.

Above all, it is known that the images recorded on the record-receiving materials coated with a porous white inorganic substance on the surface thereof particularly has a more significant discoloration or fading by ozone gas, but the water-based magenta ink composition of the present invention has a excellent fastness against gases including ozone gas and therefore it has an effect especially in recording on such a record-receiving material.

Examples of the porous white inorganic substance to be used for such an intended purpose include calcium carbonate, kaolin, talc, clay, diatom earth, synthesized amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate and the like.

In order to record on a record-receiving material by the inkjet recording method of the present invention, for example, a container containing the ink composition of the present invention is placed in a predetermined position of an inkjet printer and recording may be carried out on a record-receiving material in a typical manner. In the inkjet recording method of the present invention, not only magenta of the present invention but also ink compositions of other colors such as yellow, cyan, green, orange, blue (or violet), and according to necessity, black can be used in combination. Each color ink composition is filled into each container, which is placed (installed) in a predetermined position of an inkjet printer in the same manner for the container containing the water-based magenta ink composition for inkjet recording of the present invention and used. Examples of the inkjet printer include, for example, a piezo type inkjet printer utilizing mechanical vibration, a bubble jet® type printer utilizing foam generated by heating, and the like.

The ink composition of the present invention exhibits a vivid magenta color, has a vivid hue particularly on inkjet glossy paper, and enables recorded images excellent in fastnesses, particularly in light fastness, ozone gas fastness and moisture fastness. In addition, it is highly safe to human beings.

The ink composition of the present invention is free from precipitation and separation during storage. In addition, when the ink composition of the present invention is used for inkjet recording, clogging does not occur at an injector (inkhead). The ink composition of the present invention has no change in physical properties even in intermittent use of a continuous ink jet printer.

EXAMPLES

Hereinafter, the present invention will be further specifically explained with reference to the examples. In the examples, "part(s)" and "%" are based on weight unless otherwise specified.

The compounds of the present invention obtained in the examples had a solubility in water (at 25° C.) of 200 g/L or more.

In addition, the maximum absorption wavelength ($\lambda$max) of the compound of each example is a measured value in an aqueous solution unless otherwise specified. For the purity of each intended compound, using a HPLC, the area ratio thereof is described as purity. The analysis equipments and the analysis conditions are as follows.

Equipments used for HPLC and measurement conditions:

| | |
|---|---|
| Apparatus | HP1100 (manufactured by HP) |
| Column | YMC-Pack ODS-A (5 μm), |
| | 6.0 × 250 mm (manufactured by YMC) |
| Column temperature | 40° C. |
| Mobile phase | A: 5 mM AcONH4, B: CH3CN |
| Gradient | Bconc 20% – (30 min) – 60% |
| Flow rate | 0.8 ml/min |

Example 1

(1) While stirring, 94.8 parts of the compound of the above formula (3) ($R^1$=$CH_3$), 3.0 parts of sodium carbonate and 144.0 parts of ethyl benzoylacetate were sequentially charged in 360 parts of xylene and raised in temperature. The reaction was carried out at a temperature of 140 to 150° C. for 8 hours, and in the meantime, ethanol and water produced during the reaction were distillated out of the system by azeotropy with xylene to complete the reaction. Subsequently, the resulting was cooled, and 240 parts of methanol was added thereto at 30° C. and stirred for 30 minutes to give a precipitate, which was then separated by filtration and washed with 360 parts of methanol, followed by drying to obtain 124.8 parts of a compound of the above formula (4) ($R^1$=$CH_3$, $R^2$=H) as pale yellow needle crystals.

(2) Next, while stirring, 111 parts of the compound of the formula (4) ($R^1$=$CH_3$, $R^2$=H), 114.1 parts of para aminoacetoanilide, 30.0 parts of copper acetate monohydrate and 30.8 parts of sodium acetate were sequentially charged in 500.0 parts of N,N-dimethylformamide, and raised in temperature. The reaction was carried out at 130 to 135° C. for 3 hours. The resulting was cooled to about 50° C. to give a precipitate, which was then separated by filtration, washed with 125 parts of N,N-dimethylformamide and further with 500 parts of methanol, and subsequently washed with hot water of 80° C., followed by drying to obtain 104.7 parts of a compound of the above formula (5) ($R^1$=$CH_3$, $R^2$=H) as bluish red crystals.

(3) Next, under stirring, 342.2 parts of 30.5% fuming sulfuric acid was added to 217.7 parts of 95.0% sulfuric acid while water-cooling to prepare about 560 parts of 10% fuming sulfuric acid. Under water-cooling, 102.7 parts of the compound of the formula (5) ($R^1$=$CH_3$, $R^2$=H) was added thereto at 60° C. or less and then raised in temperature, and the reaction was carried out at 90 to 95° C. for 1.5 hours. Subsequently, the obtained reaction liquid sulfonated was added to 1500 parts of ice water, and in the meantime, the internal temperature was maintained at 50° C. or less while adding ice, and water was added to make the liquid volume 2000 parts, followed by filtration to remove away insoluble matter. Subsequently, water was added to the mother liquid to make the volume 2500 parts, and while maintaining the temperature at 20 to 40° C., 500 parts of sodium chloride was added and stirred for 5 hours to precipitate crystals, which were then separated by filtration. The resulting crystals were washed with 300 parts of a 20% aqueous sodium chloride solution to obtain 156 parts of a wet cake of the compound of the above formula (6) ($R^1$=$CH_3$, $R^2$=H) as blue crystals. Further, this wet cake was added to 800 parts of methanol and stirred at 50° C. for 30 minutes, and then the resulting precipitated solid was separated by filtration to obtain a cake, which was dried to obtain 87.0 parts of a compound of the above formula (6) ($R^1$=$CH_3$, $R^2$=H) as blue crystals.

(4) Next, 50.5 parts of the compound of the formula (6) ($R^1$=$CH_3$, $R^2$=H) and 16.7 parts of 35% hydrochloric acid were added to 320 parts of water and cooled to 10° C. To this solution, 15.3 parts of a 39.8% aqueous sodium nitrite solution was added dropwise over 10 minutes. After further stirring at 10° C. for 30 minutes, 30.8 parts of a 10% aqueous sulfamic acid solution was added thereto. This solution was adjusted to pH 9 with a 10% aqueous potassium hydroxide solution. This solution was added dropwise at 60 to 70° C. and pH=8 to 10 to a solution where 25.7 parts of potassium ethylxanthate was dissolved in 80 parts of water and heated at 65° C. After completion of the dropwise addition, this liquid was stirred at 70° C. and pH=10 for 1 hour. This solution was adjusted to 50° C. and 800 parts, to which 80 parts of sodium chloride was then added, and further slowly adjusted to pH=2 with 35% hydrochloric acid. The resulting precipitated solid was separated by filtration and washed with 200 parts of a 20% aqueous sodium chloride solution to obtain a wet cake compound of the above formula (7) ($R^1$=$CH_3$, $R^2$=H) as blue crystals. Further, this wet cake was added to 800 parts of methanol and stirred at 50° C. for 30 minutes and then the resulting precipitated solid was separated by filtration to obtain a cake, which was then dried to obtain 31.9 parts of a compound of the above formula (7) ($R^1$=$CH_3$, $R^2$=H) as violet crystals.

(5) Next, 30 parts of water, 6.9 parts of the compound of the formula (7) ($R^1$=$CH_3$, $R^2$=H), 0.05 parts of potassium iodide and 0.05 parts of t-butyl ammonium bromide were added in sequence, and this aqueous solution was raised at a temperature of 70° C. and adjusted to pH=9 with sodium hydroxide. To this solution, 5.1 parts of benzyl chloride was added and the reaction was carried out at 70° C. and pH=9 to 10 for 1 hour. This reaction liquid was added dropwise to 300 parts of ethanol while stirring, then the precipitated solid was removed away by filtration. The filtrate was distilled away under reduced pressure to obtain 4.2 parts of a compound of the above formula (8) ($R^1$=$CH_3$, $R^2$=H) as dark red crystals.

(6) Next, 4.2 parts of the compound of the formula (8) ($R^1$=$CH_3$, $R^2$=H), 5 parts of acetic acid, 0.1 parts of sodium tungstate monohydrate and 15 parts of a 30% hydrogen peroxide solution were added in sequence to 50 parts of water. The reaction was carried out at 40° C. for 2 hours. To this solution, 5 parts of sodium chloride was added to precipitate crystals, which were separated by filtration. The resulting crystals were dissolved in a small amount of water, and then isopropanol was added dropwise thereto to precipitate crystals, which were separated by filtration and dried to obtain 2.5 parts of a compound of the following formula (9) (Compound No. 1 in Table 1) as dark red crystals. λmax: 519 nm, HPLC purity: 92%.

Formula (9)

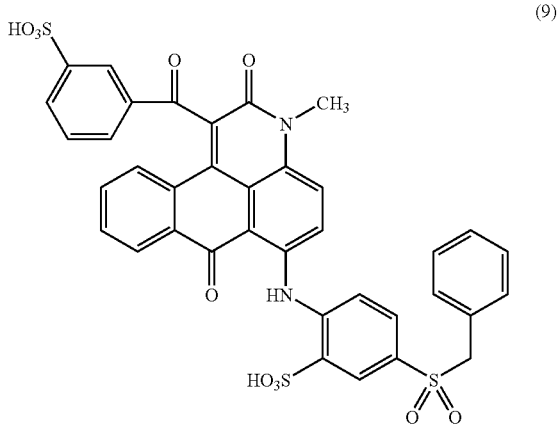

(9)

Example 2

Using the formula (7) obtained in (1) to (4) of Example 1, the same operation was conducted except that benzyl chloride in (5) of Example 1 was replaced by p-tolylmethyl chloride, to obtain 1.8 parts of a compound of the following formula (10) (Compound No. 2 in Table 1) as dark red crystals. λmax: 521 nm, HPLC purity: 86%.

Formula (10)

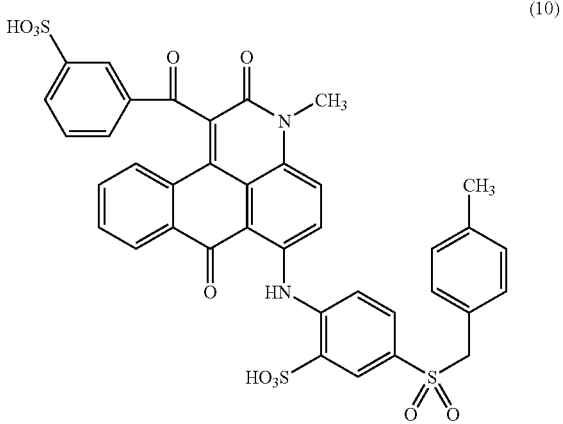

(10)

Examples 3 and 4

(A) Preparation of Ink

Using the compound (Compound No. 1 in Table 1: the compound of the formula (9)) obtained in Example 1, an ink composition having the composition ratio shown in the following table 2 was prepared and filtered with a 0.45 μm membrane filter to obtain a water-based ink composition for inkjet recording.

In this connection, ion-exchanged water was used as water and a 25% aqueous sodium hydroxide solution and water were added to adjust the pH and the total amount of the ink composition to pH 8 to 10 and 100 parts, respectively.

Using the water-based ink composition for inkjet recording obtained above, inkjet recording was performed by the method described in (B) described later and evaluation was conducted by the method described in (C) described later.

This is the end of Example 3.

Further, in the same manner except that the compound (Compound No. 2 in Table 1: the compound of the formula (10)) obtained in Example 2 was used instead of the compound of Example 1 in the following table, an ink composition and a water-based ink composition for inkjet recording were prepared. Using the latter, evaluation test was conducted in the same manner as above. This is Example 4.

TABLE 2

| | |
|---|---|
| Compound of Example 1 | 6.0 parts |
| Glycerine | 5.0 parts |
| Urea | 5.0 parts |
| N-methyl-2-pyrrolidone | 4.0 parts |
| IPA (isopropylalcohol) | 3.0 parts |
| Butyl carbitol | 2.0 parts |
| Surfactant (Surfynol 104PG 50, manufactured by Nissin Chemical Industry Co., Ltd.) | 0.1 part |
| 25% NaOH water + water | 74.9 parts |
| Total | 100.0 parts |

Comparative Example 1 and Comparative Example 2

For comparison, using the compound No. 36 (compound of the following formula (11)) of Patent Literature 1 instead of the compound of Example 1 in the above table 2, an ink composition and a water-based ink composition for inkjet recording were prepared in the same manner as in Example 3, and inkjet recording was performed and evaluation of recorded image was conducted in the same manner as in Example 3. This is Comparative Example 1.

In the same manner as in Comparative Example 1 except that the example (Compound No. 1) (compound of the following formula (12)) of Patent Literature 10 was used instead of the compound of Example 1 in the above table 2, preparation of composition, inkjet recording and evaluation of recorded image were carried out. This is Comparative Example 2.

Formula (11)

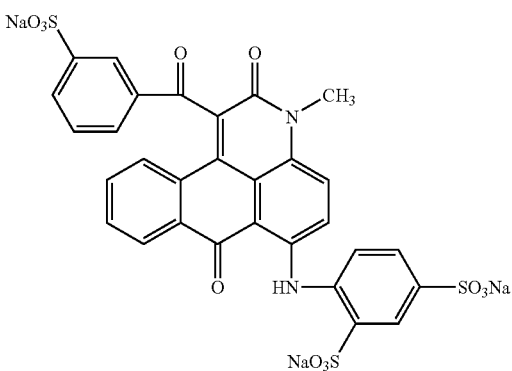

Formula (12)

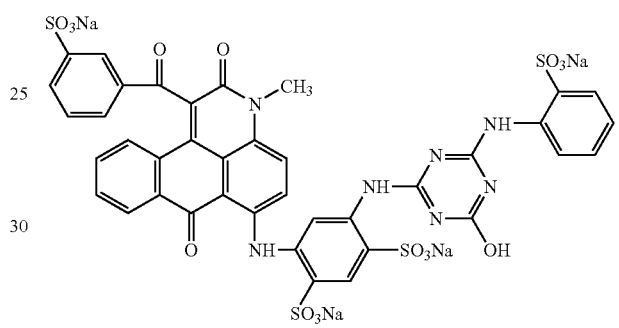

(B) Inkjet Printing

Using an inkjet printer (trade name: Pixus iP4100, manufactured by Canon Inc.), inkjet recording was performed on three kinds of record-receiving materials as glossy paper having an ink receiving layer containing a porous white inorganic substance (trade name: Professional Photopaper PR-101, manufactured by Canon Inc.; trade name: CRISPIA, manufactured by Seiko Epson Corporation; trade name: Advanced Photo Paper, manufactured by Hewlett Packard Japan, Ltd. (HP)). These three kinds of glossy papers are called glossy paper 1, glossy paper 2 and glossy paper 3, respectively. In inkjet recording, an image pattern was made so that several gradations of print density can be obtained, and printed matters were prepared.

(C) Evaluation of Recorded Image

1. Hue Evaluation 1-1. Hue Evaluation on Glossy Paper

For hue and vividness of recorded image, using a colorimetric system (GRETAG SPM50, manufactured by Gretag-Macbeth AG), recording papers printed (Examples for each recording paper have the same print density (D value)) were measured and L*, a* and b* values were calculated. Hue evaluation was conducted in comparison with a sample of Standard Magenta in Japan Color (JNC) of JPMA (Japan Printing Machinery Manufacturers Association). The results of hue evaluation for Examples 3 and 4 are shown in Table 3. In this connection, the paper used for Standard Magenta in Japan Color is Japan Color Standard Paper.

TABLE 3

|  | Brightness | Chromaticity | |
| --- | --- | --- | --- |
|  | L* | a* | b* |
| JNC Standard Magenta | 46.3 | 74.4 | −4.8 |
| Glossy paper 1 (D value = near 1.8) | | | |
| Example 3 | 49.9 | 83.5 | −3.4 |
| Example 4 | 48.7 | 82.2 | −6.7 |
| Comparative Example 1 | 43.9 | 84.7 | −23.3 |
| Comparative Example 2 | 42.7 | 84.4 | −25.9 |
| Glossy paper 2 (D value = near 2.0) | | | |
| Example 3 | 48.2 | 85.7 | −3.7 |
| Example 4 | 46.5 | 84.1 | −9.6 |
| Comparative Example 1 | 43.8 | 86.7 | −28.7 |
| Comparative Example 2 | 45.4 | 87.4 | −24.7 |
| Glossy paper 3 (D value = near 1.9) | | | |
| Example 3 | 47.9 | 83.5 | −3.4 |
| Example 4 | 46.3 | 82.0 | −7.8 |
| Comparative Example 1 | 43.5 | 85.2 | −28.2 |
| Comparative Example 2 | 43.8 | 86.4 | −25.7 |

As is clear from Table 3, it is found that in any of glossy papers 1 to 3, the hues (a*, b*) of Examples 3 and 4 are approximated to the hue of JNC Standard Magenta. Particularly in glossy paper 1, b* values for Comparative Examples 1 and 2 are respectively −23.3 and −25.9 which are very low, while b* values of Examples 3 and 4 are −3.4 and −6.7 which are extremely approximated to b* value (−4.8) of Standard Magenta, whereby Examples 3 and 4 have a hue extremely near to Standard Magenta. In addition, glossy papers 2 and 3 have the similar tendency. Further, L* values of Examples 3 and 4 are larger than those of Comparative Examples 1 and 2 in any of glossy papers 1 to 3, which means that Examples 3 and 4 have a higher brightness. From the above results, it is found that images recorded with an ink composition using the compound of the present invention have a characteristic of having a hue which is closely approximated to the hue of JNC Standard Magenta and has a high brightness.

Hereinafter, evaluation of fastnesses will be described. Three kinds of tests: tests for light fastness, ozone gas fastness and moisture fastness were conducted for fastness evaluation.

(D) Light Fastness Test of Recorded Image

Using a low temperature xenon weatherometer XL 75 (manufactured by Suga Test Instruments Co., Ltd.), test pieces printed on glossy papers 1 and 2 were irradiated at an illuminance of 10 Klux for 96 hours in a circumstance of a temperature of 24° C. and a humidity of 60% RH. The residual rate (%) was measured before and after the test and evaluated into 3 levels. For the residual rate of coloring matter in the test pieces, using a colorimetric system (GRETAG SPM50, manufactured by GretagMacbeth AG), the color difference (ΔE) of print density (D value=near 1.9) was measured before and after the irradiation. The results are shown in Table 4.

TABLE 4

|  | Glossy paper 1 | Glossy paper 2 |
| --- | --- | --- |
| Example 3 | 8.1 | 9.3 |
| Comparative Example 2 | 9.2 | 12.1 |

As is clear from Table 4, it is found that the color difference of Example 3 before and after the test is smaller than that of Comparative Example 2 in any of the glossy papers and therefore Example 3 has a good light fastness.

(E) Ozone Gas Fastness Test of Recorded Image

Using an ozone weatherometer (manufactured by Suga Test Instruments Co., Ltd.), the test pieces printed on glossy papers 1 to 3 were left at an ozone concentration of 10 ppm, a temperature of 24° C. and a humidity of 60% RH for 8 hours, the color difference (ΔE) of print density (D value=near 1.9) was measured before and after the irradiation. The results are shown in Table 5.

TABLE 5

|  | Glossy paper 1 | Glossy paper 2 | Glossy paper 3 |
| --- | --- | --- | --- |
| Example 3 | 1.4 | 0.6 | 0.8 |
| Example 4 | 1.3 | 1.4 | 1.0 |
| Comparative Example 2 | 8.0 | 2.9 | 3.3 |

As is clear from Table 5, it is found that the color differences of Examples 3 and 4 are smaller than that of Comparative Example 2 in all the glossy papers and therefore Examples 3 and 4 have a very good ozone gas fastness.

(F) Moisture Fastness Test of Recorded Image

Using a thermo-hygrostat (manufactured by Ohken Co., Ltd), test pieces printed on a glossy paper manufactured by Canon Inc. were left at a temperature of 50° C. and a humidity of 90% RH for 96 hours, and the bleeding properties were judged by visual observation before and after the test and evaluated into 3 levels. The results are shown in Table 6.

◦: bleeding is not observed
Δ: bleeding is slightly observed
×: bleeding is significantly observed

TABLE 6

|  | Glossy paper 1 |
| --- | --- |
| Example 3 | ◦ |
| Example 4 | ◦ |
| Comparative Example 1 | × |

As clear from Table 6, it is found that as for the glossy paper of Canon Inc., bleeding is significantly observed in Comparative Example 1 while bleeding is not observed in Examples 3 and 4, whereby Examples 3 and 4 have a very good moisture fastness.

From the test results in Tables 3 to 6, it is clear that the recorded images with an ink composition using the compound of the present invention have a characteristic of having a hue which is very near to JNC Standard Magenta and which has a high brightness, and the recorded images are excellent in fastnesses, particularly in light fastness, ozone gas fastness and moisture fastness, whereby it can be said that the compound of the present invention is extremely excellent as a magenta coloring matter for inkjet.

The invention claimed is:

1. An anthrapyridone compound represented by the following formula (1) or a salt thereof:

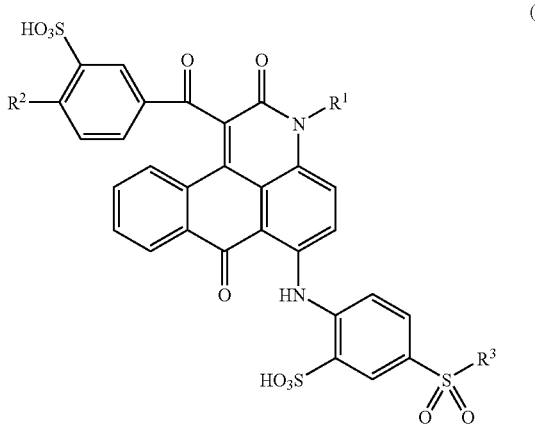

wherein, $R^1$ represents a hydrogen atom, an alkyl group, a hydroxy lower alkyl group, a cyclohexyl group, a mono- or di-alkyl amino alkyl group or a cyano lower alkyl group;

$R^2$ represents a hydrogen atom or a methoxy group, and $R^3$ represents an alkyl group;

wherein said alkyl group may have a substituent selected from the group consisting of a sulfonic acid group, a carboxy group, an alkoxycarbonyl group, an acyl group, a carbamoyl group, a cyano group, an alkoxy group, a phenyl alkoxy group, a phenoxy group, a hydroxy group and a nitro group, an aryl alkyl group or a heterocycle-substituted alkyl group wherein said aryl and said heterocycle may have a substituent selected from the group consisting of a halogen atom, a nitro group, a cyano group, a hydroxy group, a sulfonic acid group, a substituted or unsubstituted alkyl group, a carboxy group, an alkoxycarbonyl group, a carbamoyl group, an alkoxy group and a phenoxy group, respectively.

2. The anthrapyridone compound or the salt thereof according to claim 1, wherein $R^1$ is a hydrogen atom or a methyl group.

3. The anthrapyridone compound or the salt thereof according to claim 1, wherein $R^1$ is a hydrogen atom or a methyl group, the alkyl group for $R^3$ is a (C1 to C4) alkyl group wherein said alkyl group may have a substituent selected from the group consisting of a sulfonic acid group, a carboxy group, an alkoxycarbonyl group, an acyl group, a carbamoyl group, a cyano group, an alkoxy group, a phenyl alkoxy group, a phenoxy group, a hydroxy group and a nitro group, and the aryl alkyl group for $R^3$ is a phenyl alkyl group or a naphthyl alkyl group wherein said phenyl or said naphthyl may have a substituent selected from the group consisting of a halogen atom, a nitro group, a cyano group, a hydroxy group, a sulfonic acid group, a substituted or unsubstituted alkyl group, a carboxy group, an alkoxycarbonyl group, a carbamoyl group, an alkoxy group and a phenoxy group.

4. The anthrapyridone compound or the salt thereof according to claim 1, wherein $R^1$ is a hydrogen atom or a methyl group, the alkyl group for $R^3$ is a (C1 to C4) alkyl group wherein said alkyl group may have a substituent selected from the group consisting of a sulfonic acid group, a carboxy group, an alkoxycarbonyl group, an acyl group, a carbamoyl group, a cyano group, an alkoxy group, a phenyl alkoxy group, a phenoxy group, a hydroxy group and a nitro group, the aryl alkyl group for $R^3$ is a phenyl (C1 to C2) alkyl group or a naphthyl (C1 to C2) alkyl group wherein said phenyl or said naphthyl may have a substituent selected from the group consisting of a halogen atom, a nitro group, a cyano group, a hydroxy group, a sulfonic acid group, a substituted or unsubstituted alkyl group, a carboxy group, an alkoxycarbonyl group, a carbamoyl group, an alkoxy group and a phenoxy group, and the heterocycle-substituted alkyl group for $R^3$ is a pyridyl (C1 to C2) alkyl group wherein said pyridyl may have a substituent selected from the group consisting of a halogen atom, a nitro group, a cyano group, a hydroxy group, a sulfonic acid group, a substituted or unsubstituted alkyl group, a carboxy group, an alkoxycarbonyl group, a carbamoyl group, an alkoxy group and a phenoxy group.

5. The anthrapyridone compound or the salt thereof according to claim 4, wherein the (C1 to C4) alkyl group for $R^3$ is unsubstituted or has a substituent selected from the group consisting of a sulfonic acid group, a carboxy group, a (C1 to C4) alkoxycarbonyl group, an acyl group, a carbamoyl group, a cyano group, a (C1 to C4) alkoxy group, a phenyl (C1 to C4) alkoxy group, a phenoxy group, a hydroxy group and a nitro group, the phenyl (C1 to C2) alkyl group or the naphthyl (C1 to C2) alkyl group or the pyridyl (C1 to C2) alkyl group for $R^3$ is unsubstituted, or each of said phenyl, said naphthyl and said pyridyl has a substituent selected from the group consisting of a halogen atom, a nitro group, a cyano group, a hydroxy group, a sulfonic acid group, an unsubstituted (C1 to C4) alkyl group, a (C1 to C4) alkyl group having a substituent wherein said substituent is selected from the group consisting of a carboxy group, a (C1 to C4) alkoxycarbonyl group, a (C1 to C4) alkoxy group, a phenoxy group and a sulfonic acid group, a carboxy group, a (C1 to C4) alkoxycarbonyl group, a carbamoyl group, a (C1 to C4) alkoxy group and a phenoxy group.

6. The anthrapyridone compound or the salt thereof according to claim 5, wherein the (C1 to C4) alkyl group for $R^3$ is unsubstituted or has, as a substituent, a group selected from the group consisting of a sulfonic acid group, a carboxy group, a methoxycarbonyl group, a benzoyl group, a carbamoyl group, a cyano group, a methoxy group, a phenyl methoxy group, a phenoxy group, a hydroxy group and a nitro group, and the phenyl (C1 to C2) alkyl group or the naphthyl (C1 to C2) alkyl group or the pyridyl (C1 to C2) alkyl group for $R^3$ is unsubstituted, or each of said phenyl, said naphthyl and said pyridyl has, as a substituent, a group selected from the group consisting of a chlorine atom, a (C1 to C4) alkyl group, a methoxycarbonyl (C1 to C4) alkyl group, a methoxycarbonyl group and a methoxy group.

7. The anthrapyridone compound or the salt thereof according to claim 1, wherein $R^1$ is a methyl group, $R^2$ is a hydrogen atom, and $R^3$ is a phenyl (C1 to C2) alkyl group which may be substituted by an unsubstituted (C1 to C4) alkyl group on the phenyl thereof.

8. The anthrapyridone compound or the salt thereof according to claim 1, wherein $R^1$ is a methyl group, $R^2$ is a hydrogen atom, and $R^3$ is a phenyl (C1 to C2) alkyl group which may be substituted by a methyl group on the phenyl thereof.

9. An ink composition comprising the anthrapyridone compound or the salt thereof according to claim 1.

10. The ink composition according to claim 9, which contains water and a water-soluble organic solvent.

11. The ink composition according to claim 10, which is for inkjet.

12. The ink composition according to claim 9, wherein the content of an inorganic salt in the anthrapyridone compound or the salt thereof according to claim 1 is 1% by weight or less.

13. The ink composition according to any one of claims 9 to 12, wherein the content of the anthrapyridone compound or the salt thereof according to claim 1 is 0.1 to 20% by weight.

14. An inkjet recording method comprising discharging ink droplets of the ink composition according to claim 9 in response to a recording signal for recording on a record-receiving material.

15. The inkjet recording method according to claim 14, wherein the record-receiving material is a communication sheet.

16. The inkjet recording method according to claim 15, wherein the communication sheet has an ink receiving layer containing a porous white inorganic substance.

17. The colored product colored with the ink composition according to claim 9.

18. The colored product according to claim 17, which is colored by an inkjet printer.

19. An inkjet printer where a container containing the ink composition according to claim 9 is installed.

20. The anthrapyridone compound or the salt thereof according to claim 1, wherein $R^1$ is a methyl group, $R^2$ is a hydrogen atom, and $R^3$ is a benzyl group or a tolylmethyl group.

21. An ink composition containing the anthrapyridone compound or the salt thereof according to claim 20.

* * * * *